(12) United States Patent
Powell, Jr.

(10) Patent No.: US 7,739,771 B2
(45) Date of Patent: Jun. 22, 2010

(54) WINDSHIELD WIPER DRIVE ASSEMBLY WITH DUAL SECTOR GEAR DRIVE

(75) Inventor: Edward S. Powell, Jr., Albany, OR (US)

(73) Assignee: Albany Magneto Equipment, Inc., Jefferson, OR (US)

( * ) Notice: Subject to any disclaimer, the term of this patent is extended or adjusted under 35 U.S.C. 154(b) by 1039 days.

(21) Appl. No.: 11/440,608

(22) Filed: May 24, 2006

(65) Prior Publication Data

US 2007/0271722 A1  Nov. 29, 2007

(51) Int. Cl.
*B60S 1/26* (2006.01)
*B60S 1/16* (2006.01)
(52) U.S. Cl. ............... 15/250.23; 15/250.27; 15/250.14
(58) Field of Classification Search ............. 15/250.29, 15/250.23, 250.27, 250.351; 74/559; 29/428
See application file for complete search history.

(56) References Cited

U.S. PATENT DOCUMENTS

| | | | |
|---|---|---|---|
| 1,913,308 A * | 6/1933 | Hueber et al. ............. 91/329 |
| 2,533,963 A | 12/1950 | Sacchini | |
| 2,915,772 A * | 12/1959 | Ziegler ................... 15/250.23 |
| 3,035,296 A | 5/1962 | Deibel | |
| 3,247,540 A | 4/1966 | Howard et al. | |
| 3,404,423 A | 10/1968 | Howard et al. | |
| 3,644,956 A | 2/1972 | Parker | |
| 3,688,334 A | 9/1972 | Peterson | |
| 3,689,955 A | 9/1972 | Winkelmann | |
| 3,729,766 A | 5/1973 | Buchanan, Jr. | |
| 3,749,431 A | 7/1973 | Schmid et al. | |
| 3,768,112 A | 10/1973 | Kolb | |
| 3,831,219 A | 8/1974 | Deutscher et al. | |
| 4,009,502 A | 3/1977 | Tamaki et al. | |
| 4,245,369 A * | 1/1981 | Clem ..................... 15/250.23 |
| 4,546,518 A | 10/1985 | Harbison et al. | |
| 4,716,612 A * | 1/1988 | D'Alba ................... 15/250.23 |
| 5,351,423 A | 10/1994 | Vohl | |
| 5,473,955 A | 12/1995 | Stinson | |
| 5,507,585 A | 4/1996 | Diederich et al. | |
| 5,542,145 A | 8/1996 | Buchanan, Jr. et al. | |
| 5,549,286 A | 8/1996 | Vacca | |
| 5,675,862 A | 10/1997 | Reinl | |
| 6,059,294 A | 5/2000 | Gorce | |
| 6,196,752 B1 | 3/2001 | Komiyama | |
| 6,196,754 B1 | 3/2001 | Bruemmer et al. | |
| 6,406,089 B1 | 6/2002 | Zimmer | |
| 6,510,580 B1 | 1/2003 | Saitou | |
| 6,637,798 B2 | 10/2003 | Hoshikawa et al. | |
| 6,718,593 B2 | 4/2004 | Shido | |

(Continued)

FOREIGN PATENT DOCUMENTS

DE          4400296          7/1995

(Continued)

*Primary Examiner*—Monica S Carter
*Assistant Examiner*—Stephanie Newton
(74) *Attorney, Agent, or Firm*—Chernoff, Vilhauer, McClung & Stenzel, LLP

(57) ABSTRACT

A wiper drive system including a wiper drive mechanism driving a pair of wiper drive arms to sweep a wiper blade across a surface. The wiper drive mechanism has a motor driving a rack engaged with a sector gear that is supported by pivot bearings. Each wiper drive arm is driven by a sector gear.

15 Claims, 13 Drawing Sheets

U.S. PATENT DOCUMENTS

| | | |
|---|---|---|
| 6,901,623 B2 | 6/2005 | Ohashi et al. |
| 2004/0221413 A1 | 11/2004 | Hultquist et al. |
| 2004/0226128 A1 | 11/2004 | Sugiyama |
| 2004/0253049 A1 | 12/2004 | Bissonnette et al. |

FOREIGN PATENT DOCUMENTS

| | | |
|---|---|---|
| FR | 2789132 | 8/2000 |
| JP | 2001151079 A * | 6/2001 |

* cited by examiner

WINDSHIELD WIPER DRIVE ASSEMBLY WITH DUAL SECTOR GEAR DRIVE

BACKGROUND OF THE INVENTION

The present invention relates to a wiper system for clearing a portion of a surface such as a windshield, and relates in particular to a mechanical drive for a large wiper.

The windshields or windows of large vehicles such as farming equipment, recreational vehicles, and buses are large and may be convex to provide a generous field of vision for their drivers. A windshield wiper system for these types of vehicles should be capable of clearing a large portion of a windshield for the driver. The windshield wiper systems on such vehicles should be capable of adequately sweeping dust, debris, rain and the like away from a significant portion of the windshield to allow the driver to see as well as possible through the windshield.

A typical windshield wiper system for a large window has a large wiper blade including a thin rubber edge. A windshield wiper drive system drives the wiper blade to sweep across and clear a portion of the windshield for the driver. Many windshield wiper drive systems contain a pantograph linkage that allows for the wiper blade to be kept in a steady orientation as it sweeps through an arc across the windshield.

In some previous pantograph arrangements an idler arm has controlled the blade angle, but the idler has had to be carried along by the wiper drive arm, and any looseness in such linkages causes lag and sloppiness in the movement of the wiper blade. As a result wiper blades often skitter ineffectively across a windshield.

At the point where the wiper blade has completed a sweep in one direction, it stops and changes direction. Many windshield wiper systems become wobbly or insecure when the wiper blade reaches the point at which it changes direction, resulting in a decrease in quality of the wiper blade's ability to sweep those portions of the windshield. Additionally, in many previous drive systems the reversal of the sweep at each end of the swept arc has required a significantly increased drive motor electric current.

In some previously available wiper drive systems pivot shafts for wiper drive arms have been asymmetrically located at one end of a drive mechanism housing, requiring careful consideration by a designer of a vehicle or machine with limited space for installation of such a wiper drive mechanism.

An improvement desired, then, is a wiper drive system capable of driving a large wiper blade on a large window, with continued control of the orientation of wiper blades and without requiring large increases in drive motor power at the ends of a swept arc.

SUMMARY OF THE INVENTION

The present invention provides a novel wiper drive system well adapted for wiping large surfaces, such as windows or windshields of large farming machinery, recreational vehicles, buses or ships, as explained below and defined in the appended claims.

As a first aspect, a windshield wiper system embodying the present invention provides a wiper drive mechanism having a pair of wiper drive arms each driven by a sector gear meshed with a rack driven reciprocatingly by a motor.

As a second aspect, a wiper drive system embodying the present invention may include a pair of wiper arm rocker or pivot drive shafts supported in a convenient central location in a drive assembly housing.

In one embodiment a windshield wiper drive system may have a gear case that contains the sector gears, rack, and slide track, and a crank mounted on a shaft extending into the gear case and connected to the rack through a link to drive the rack reciprocatingly.

As another aspect of the present invention, a pair of windshield wiper drive mechanisms may be interconnected. A connecting member attached to a rack in each of the respective wiper drive mechanisms causes the two racks to move together and thus coordinates movement of the wiper drive mechanisms with each other. Both of the wiper drive mechanisms thus can be driven by the same motor and in coordination with the other. The wiper drive mechanisms can be arranged with respect to each other so that the coordinated movement of the wiper drive arms is either in opposite or the same directions.

The foregoing and other features and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
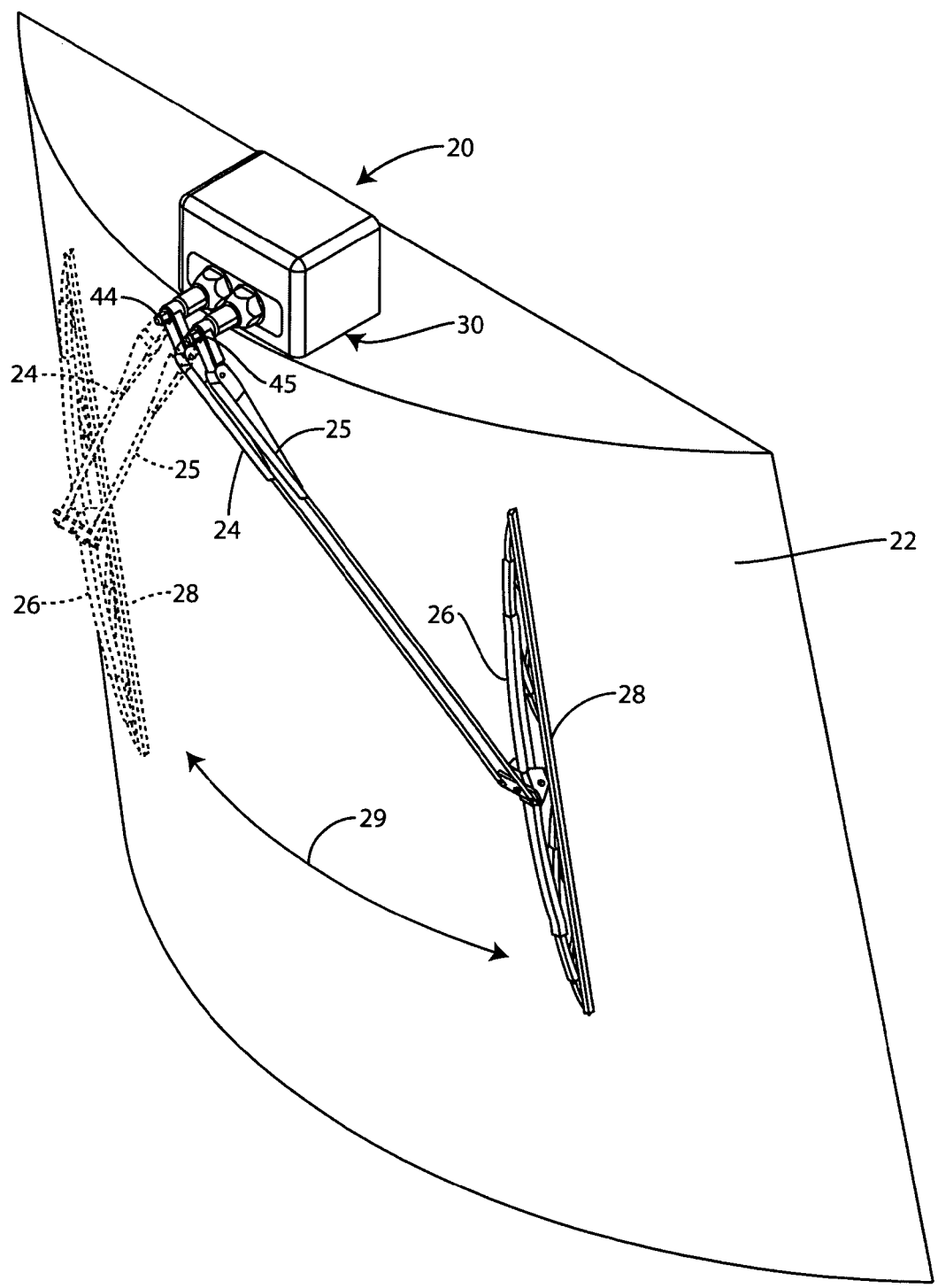
FIG. 1 is an isometric view of a curved windshield equipped with a wiper system which is an exemplary embodiment of the present invention.

Referring to the drawings that form part of the disclosure herein, an exemplary windshield wiper system 20 embodying various aspects of the invention is shown in FIG. 1, mounted to sweep across a non-planar surface, such as a windshield 22 of a large vehicle, to wipe away dirt, debris, rain, snow, and the like so that a driver of such a large vehicle may have fewer obstructions in his or her field of vision. The windshield wiper system 20 includes a pair of wiper drive arms 24 and 25, and a conventional large wiper blade 26, including a conventional narrow rubber edge strip 28 fitted in the wiper blade 26. The edge strip 28 extends along the length of the wiper blade 26 and is held in contact with the windshield 22 to wipe unwanted matter off the area over which it sweeps. The pair of wiper drive arms 24 and 25 are driven by a wiper drive mechanism 30 including a motor, to sweep the wiper blade 26 across the surface of a windshield 22, as indicated by the arrow 29.

The wiper drive mechanism 30 is desirably attached to a vehicle in a location near the windshield 22 where it does not obstruct a significant portion of the driver's field of vision. As shown in FIG. 1, the wiper drive mechanism 30 is attached to the vehicle at the top of the windshield 22. In another installation, the wiper drive mechanism 30 may be placed below a windshield or at any other location that allows the driver's field of view to remain generally free of obstruction by the wiper drive mechanism 30.

Figure 2:
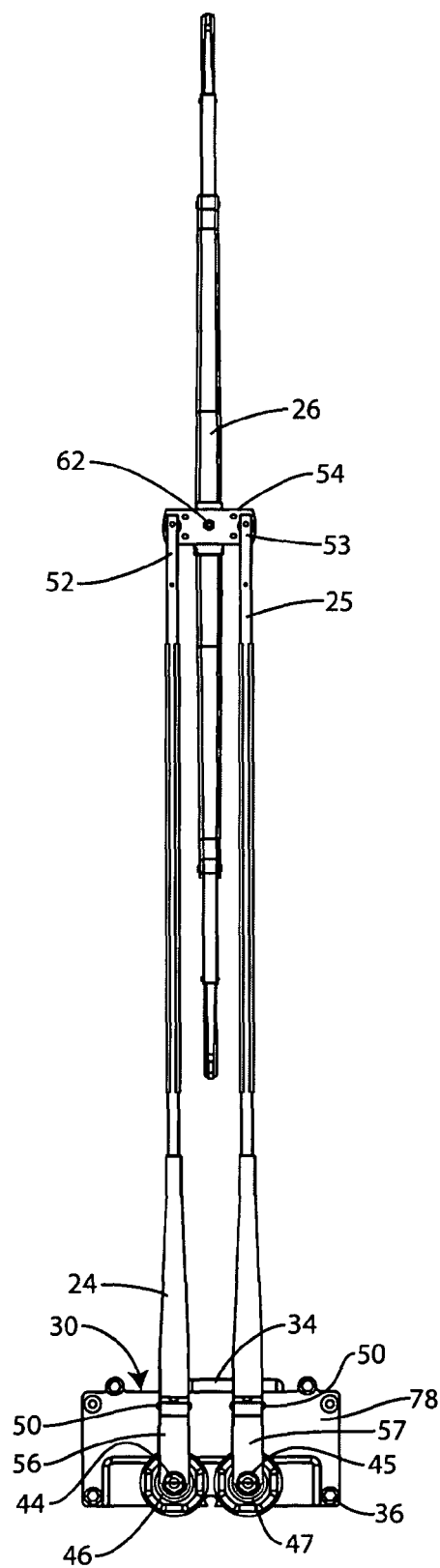
FIG. 2 is a front elevational view of a wiper incorporating an exemplary drive mechanism which is an embodiment of the present invention.
Figure 3:
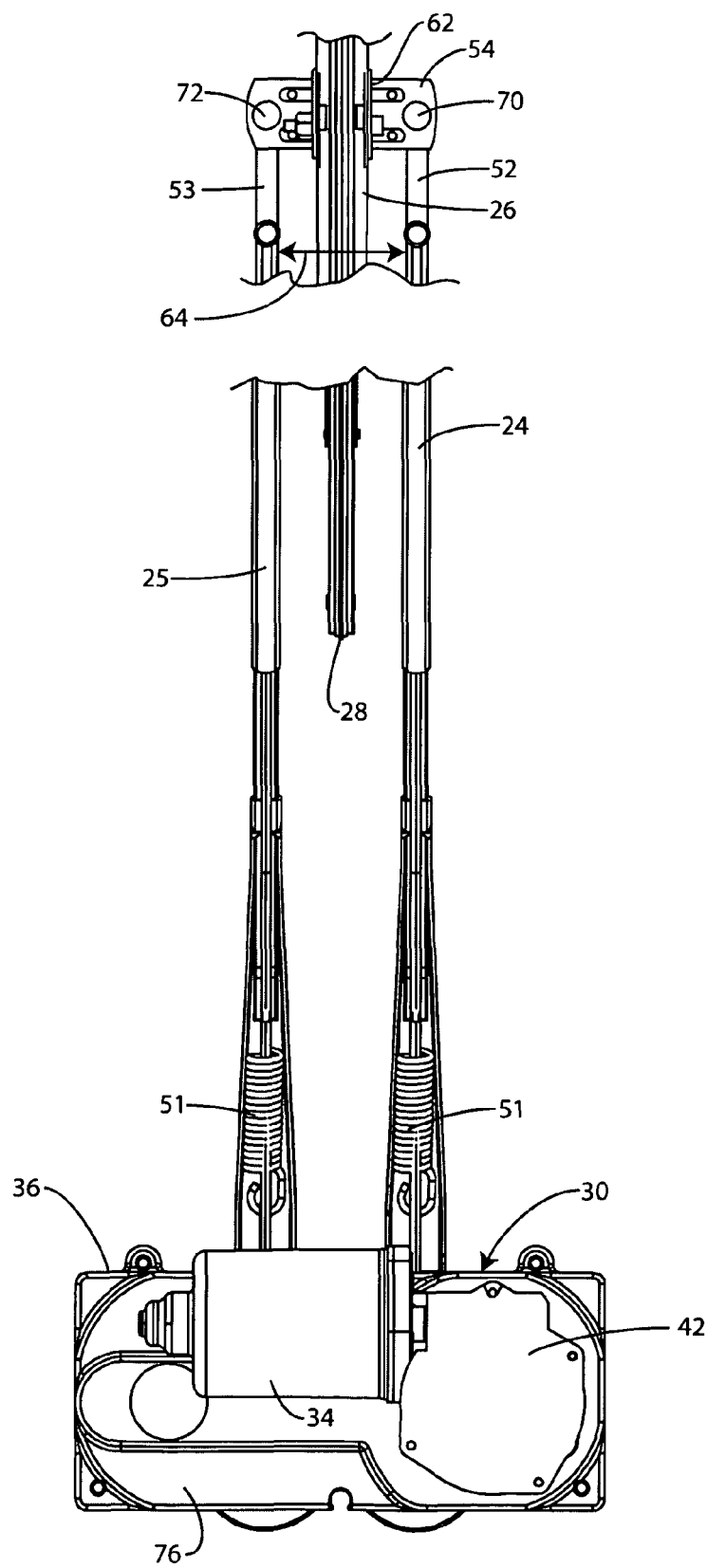
FIG. 3 is a rear elevational view of the wiper shown in FIG. 2, at an enlarged scale, with the wiper drive arms and blade foreshortened.

Referring also to FIGS. 2 and 3, the wiper drive mechanism 30 may include a gear case 36 and a conventional electric motor 34 may be attached to the gear case 36. A reduction gear 42, such as a worm gear shown together with its housing, is used to reduce motor speed and increase available torque to power the wiper drive mechanism 30.

A pair of wiper arm drive pivot or rocker shafts 44 and 45 of the wiper drive mechanism 30 extend through a pair of bearing support tubes 46 and 47 in the gear case 36 and carry the wiper drive arms 24 and 25. As shown in FIG. 1, the rocker shafts 44 and 45 extend to a predetermined distance out from the windshield 22. A hinge joint 50 in each wiper drive arm 24 and 25 allows an associated spring 51 bridging the hinge joint 50 to urge the drive arms inward toward the windshield 22, to keep the edge strip 28 of the wiper blade 26 pressing firmly against the windshield 22 throughout the swept area.

As shown in FIG. 2, both wiper drive arms 24 and 25 are of substantially equal length and are driven in a coordinated manner by the wiper drive mechanism 30 located within the gear case 36. Inner ends 56, 57 of the wiper drive arms 24, 25 are attached respectively to the pivot or rocker shafts 44 and 45, and the outer ends 52, 53 of the wiper drive arms 24, 25 are connected to respective opposite ends of a bridge 54. The bridge 54 is oblong in shape, and the wiper blade 26 is carried by a central portion 62 of the bridge 54 between the outer ends 52, 53 of the wiper drive arms. This arrangement distributes the forces needed to sweep the wiper blade 26 across the windshield 22 and creates greater control over the wiper blade 26 to prevent the wiper blade 26 from wobbling over the windshield 22. The spacing 64 between the wiper drive arms 24 and 25 should be wide enough to create adequate leverage to prevent the wiper blade 26 from wobbling and yet not too wide to keep the wiper blade 26 from sweeping close to the edges of the windshield 22.

The bridge 54 has two pivots 70 and 72, which may be of well known construction, that attach of the outer ends 52 and 53 of the two respective wiper drive arms 24 and 25 to the bridge 54. The two pivots 70 and 72 allow each of the wiper drive arms 24 and 25 to rotate with respect to the bridge. The rotation of the two wiper drive arms 24 and 25 about the bridge pivots 70 and 72 allows the bridge 54 and the wiper blade 26 to maintain a desired orientation with respect to the windshield 22, while the two wiper drive arms 24 and 25 both sweep simultaneously through an arc of as much as 90 degrees. It will be understood that the orientation of the blade 26 can be varied by the changing the angle of its attachment to the bridge 54, and the orientation can be made to vary periodically during each sweep of the blade 26 by making the wiper drive arms 24 and 25 unequal in length.

Referring again to FIG. 3, the gear case 36 houses and supports the various components of the wiper drive mechanism 30 to protect them from external contaminants and keep them aligned with each other as required for operability and durability. The motor 34 is attached to the reduction gear 42, which is in turn attached to the rear of the gear case 36. The gear case 36, as shown herein, includes two pieces, a box-like rear or case portion 76 and a generally planar front or cover portion 78, including the forwardly extending bearing support tubes 46 and 47.

Figure 4:
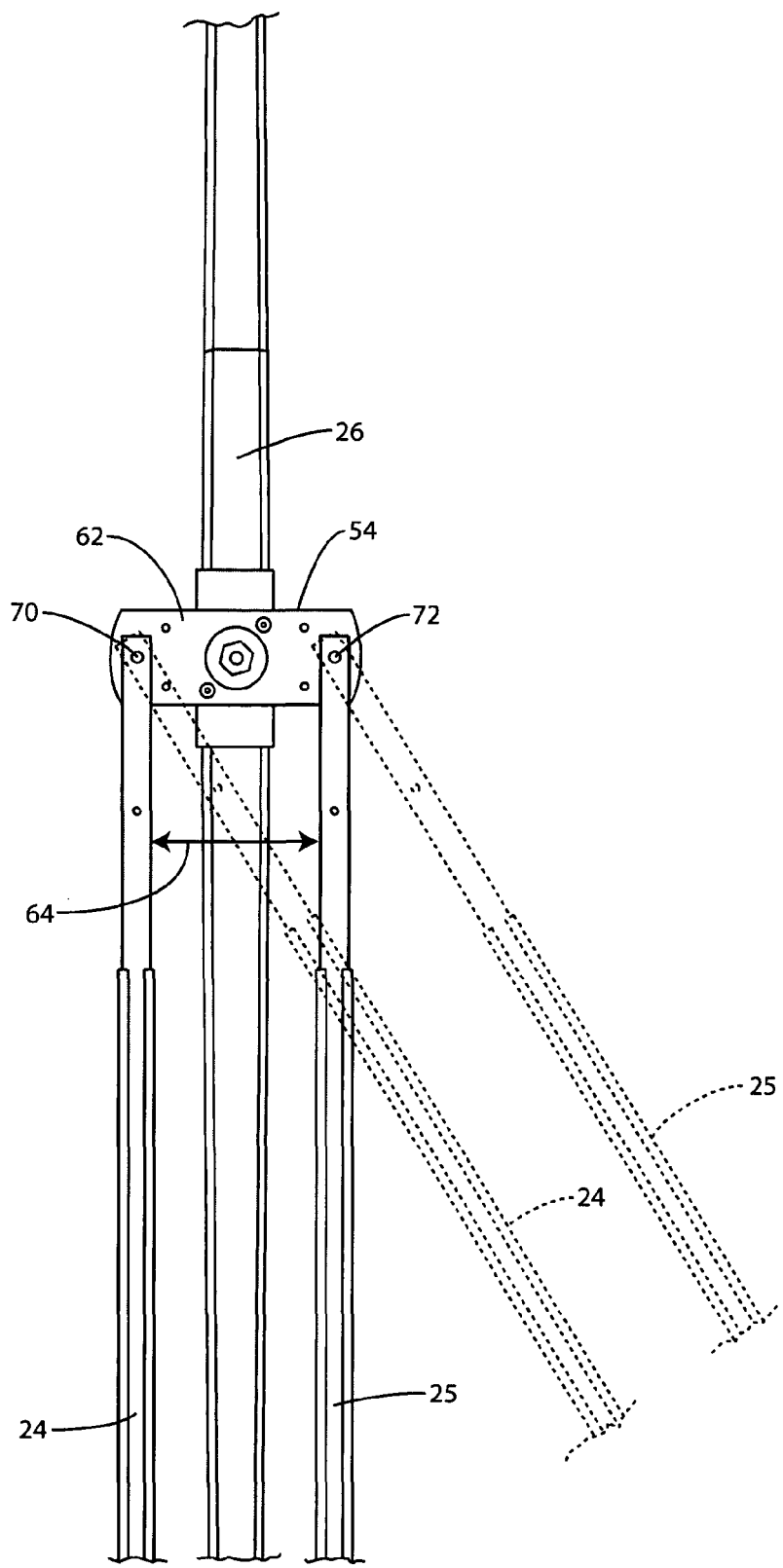
FIG. 4 is a fragmentary front elevational view, at an enlarged scale, of a portion of the wiper shown in FIG. 2, including portions of the blade and the drive arms.

Referring to FIG. 4, the pivots 70 and 72 on the bridge 54 define respective bridge pivot axes around which the wiper drive arms 24, 25 may rotate. The wiper drive mechanism 30, the wiper drive arms 24, 25, and the bridge 54 thus form a pantograph linkage that sweeps the wiper blade 26 across the windshield 22 in an arc, yet causes the wiper blade 26 to remain in a generally vertical position while it is swept across the windshield 22, so that the wiper blade 26 can sweep the desired portion of the surface area of the windshield 22.

Figure 5:
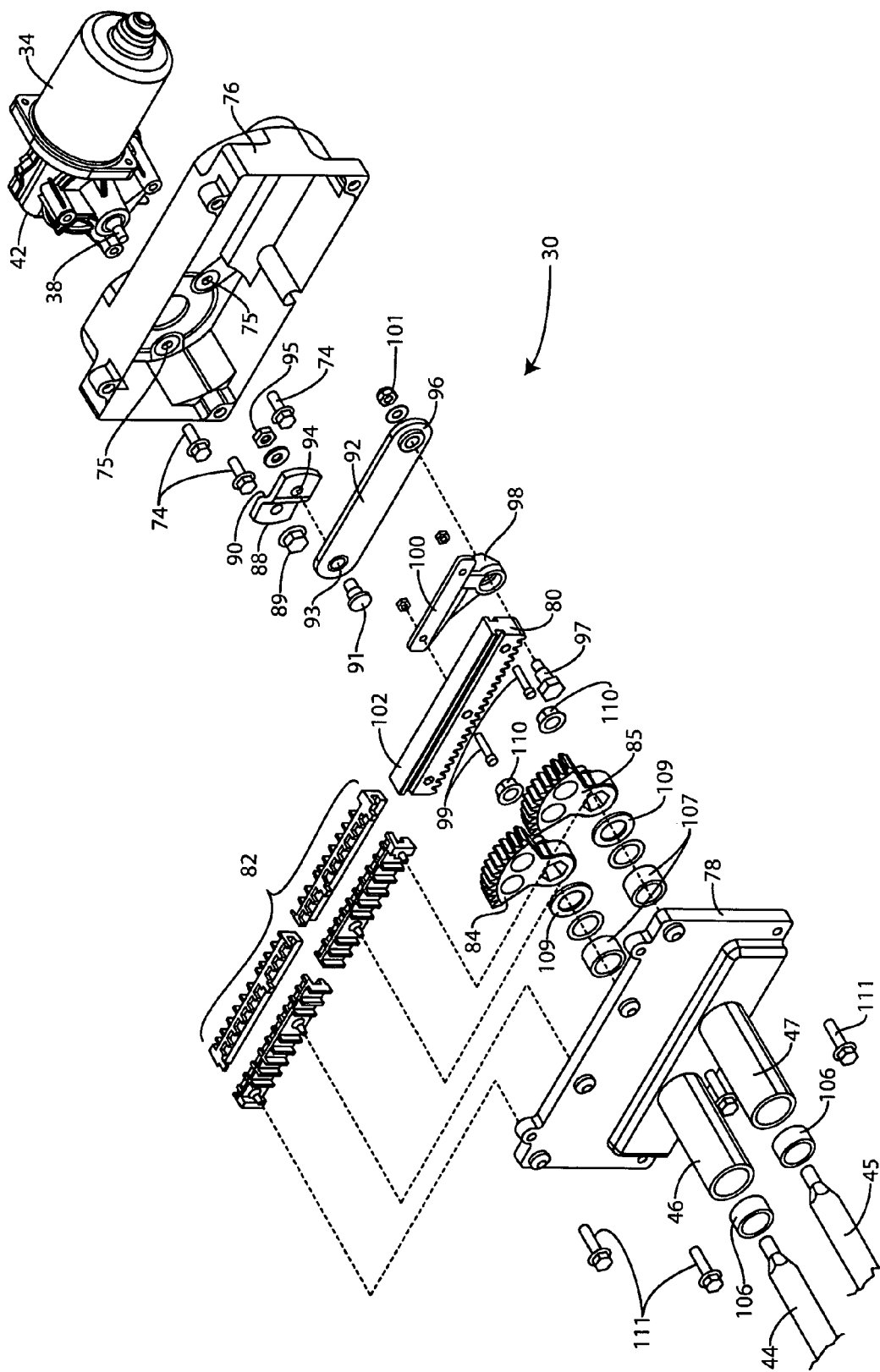
FIG. 5 is an exploded isometric view of a portion of the wiper drive mechanism shown in FIGS. 2-3.
Figure 6:
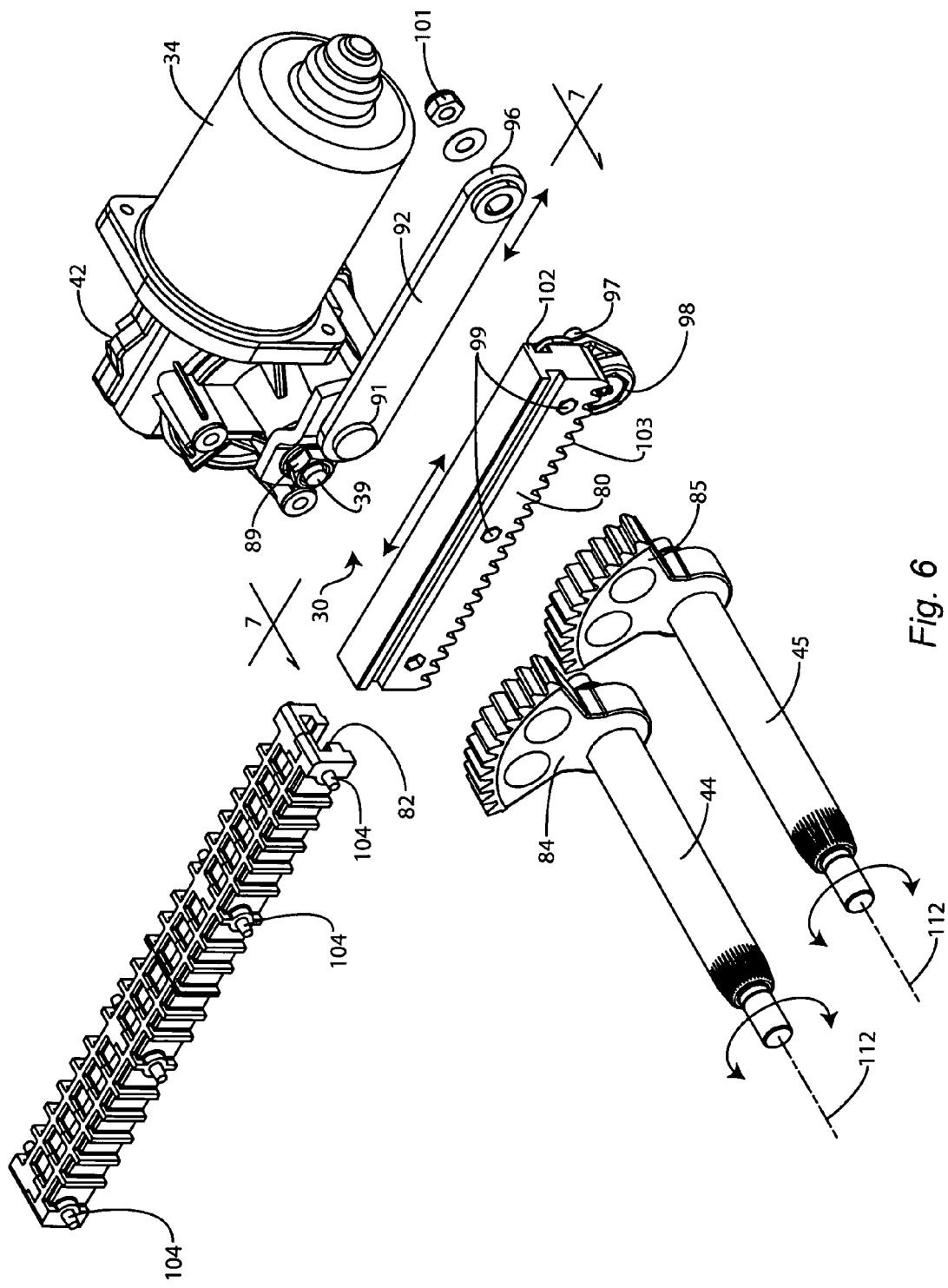
FIG. 6 is an exploded isometric view of the slide track, motor assembly, rack, and sector gears of the wiper drive mechanism shown in FIGS. 2-5, at an enlarged scale.

Referring to FIGS. 5 and 6, an output or crank shaft 38 extends from the reduction gear 42. The wiper drive mechanism 30 includes a rack 80, a slide track 82, a pair of sector gears 84, and a pair of rocker shafts 44. The drive or crank shaft 38 is driven by the reduction gear 42, whose housing is attached to and supports the motor 34. The output or crank shaft 38 extends from the reduction gear 42 through a drive shaft opening 40 in the rear portion 76 of the gear case 36. An extended or flexible drive shaft may extend from a motor or reduction gear to the gear case 36 in an alternative embodiment to allow for remote location of the motor. The motor 34 may conventionally be electric; however, any motor, such an air or hydraulic motor, capable of driving the wiper drive mechanism 30 with the needed amount of torque and power may be used. The reduction gear housing 42 may be fixedly attached to the rear portion 76 of the gear case 36 by suitable fasteners such as bolts 74.

The drive or crank shaft 38 may have a threaded end 39 and a shoulder to receive a crank arm 88 fixedly attached by a suitable fastener such as a nut 89. The crank arm 88 includes a jog 90 located in its central portion, to provide clearance beyond the shaft 38 for a drive link 92, as shown best in FIG. 6. The drive link 92 is attached to the crank arm 88 by a shoulder bolt 91 or equivalent fastener that is mounted in a hole 94 defined in the crank arm 88 and that may be secured by a fastener such as a nut 95, as shown in FIG. 5, so that the shoulder bolt 91 is rotatable in a hole defined in the drive link 92 and acts as a crank pin. Thus, when the output or crank shaft 38 of the reduction gear 42 causes the crank arm 88 to rotate, the driven or crank end of the drive link 92 rotates about the drive shaft 38. The jog 90 in the crank arm 88 provides clearance for the drive link 92 from the drive shaft 38 and allows the driven or crank end of the drive link 92 to be carried about the drive shaft 38 in a smooth circular motion.

The outer end 96 of the drive link 92 is attached, by a suitable pivot pin such as a shoulder bolt 97, to a drive pin fitting 98 in a rack drive mounting piece 100 drivingly fastened to a side of the rack 80 by suitable fasteners such as bolts 99, as shown in FIGS. 5 and 6. The shoulder bolt 97 may be fitted rotatably through a hole in the drive pin fitting 98, while the shoulder bolt 97 is mounted fixedly against a spacer on the outer end of the drive link 92 as by a nut 101 shown in FIG. 6.

A rail 102 shaped to fit matingly within and to be guided by the slide track 82 extends along the rack 80 opposite its teeth 103. The rail 102 includes a T-shaped portion that fits securely in the slide track 82 so as to slide smoothly in a straight line while it is driven reciprocatingly by the drive link 92 in response to rotation of the crank arm 88 by and with the crank shaft 38. As shown in FIG. 5, the slide track 82 may be made as, for example, four pieces, relatively equal in size, that fit matingly with each other to form the assembled slide track 82, as shown in FIG. 6. The parts of the slide track 82 may be molded of a tough lubricative plastic in any desired number of pieces, which, when assembled, may be fastened into the cover portion 78 of the gear case 36 by integral plastic pins 104 fitted into corresponding holes 105 in the cover piece 78.

As shown in FIG. 5, the cover piece 78 of the gear case 36 includes a pair of bearing support tubes 46 and 47 each housing a pair of suitable bearings, an outer rocker shaft bearing 106 and an inner rocker shaft bearing 107. The two rocker shafts 44, 45, supported by the rocker shaft bearings 106 and 107, extend through the bearing support tubes 46, 47. Near an interior end, each rocker shaft 44 may be tapered and have flat faces 108 so that it fits matingly into a corresponding socket in a respective one of the sector gears 84, 85, to be driven thereby. A set of axial spacers 109 may be fitted on the rocker shafts 44 and 45 to provide a required location of each sector gear 84 or 85 with respect to the cover 78. A suitable nut 110 or other fastener keeps each shaft 44 and 45 mated with the respective sector gear 84 or 85.

The gear case 36 may be constructed conventionally, as by being cast and then machined to create a sufficiently precise fit of the box-shaped rear portion 76 to the generally flat cover portion 78 of the gear case 36. The box-shaped rear portion 76 and the cover portion 78 of the gear case 36 may be held together by fasteners such as bolts 111 so that the gears of the wiper drive mechanism 20 may be protected within the gear case 36.

Figure 7:
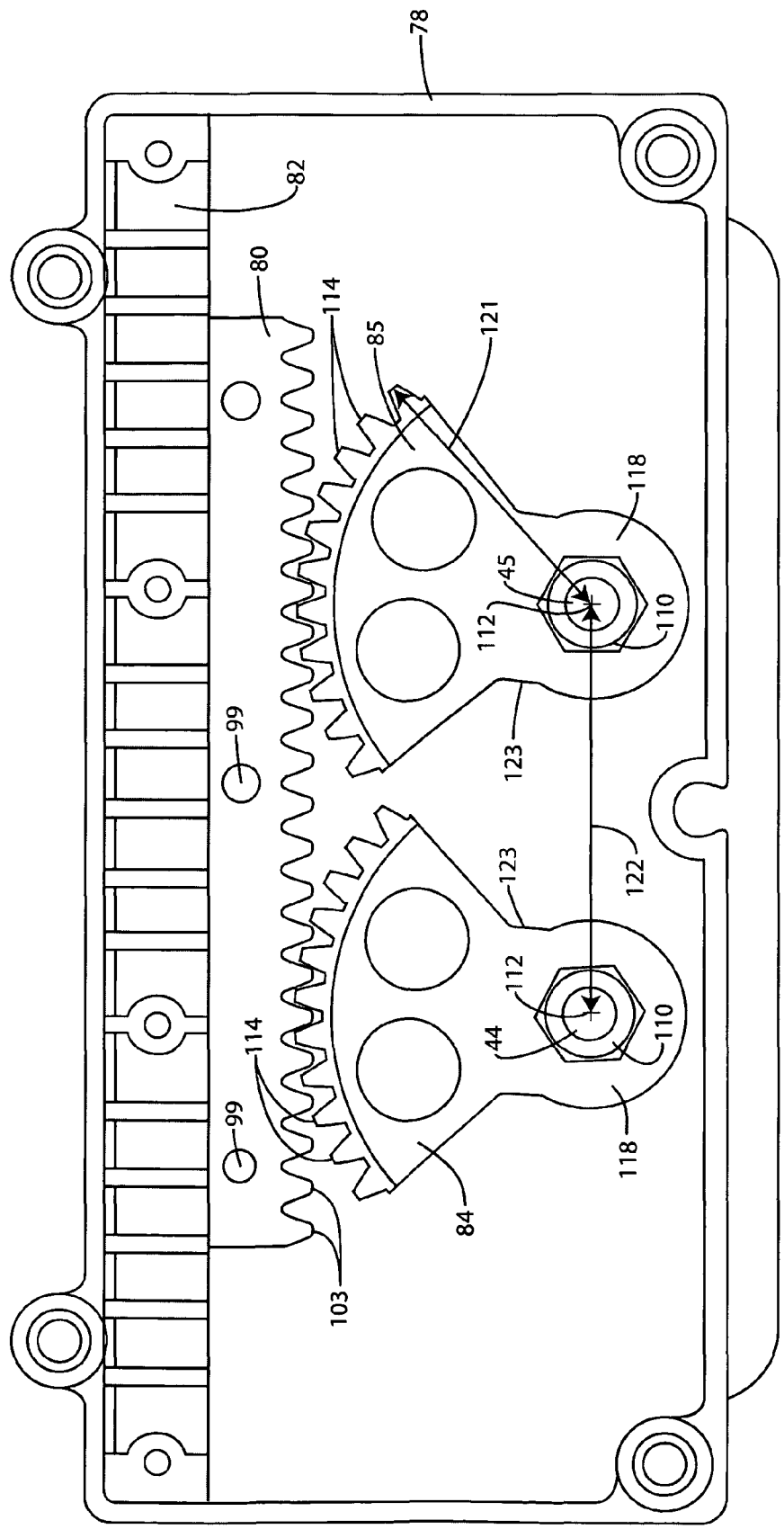
FIG. 7 is a simplified view taken in the direction of line 7-7 of FIG. 6, showing the sector gears meshed with the rack of the wiper drive mechanism shown in FIGS. 5 and 6, together with the cover or front portion of the gear case.
Figure 8:
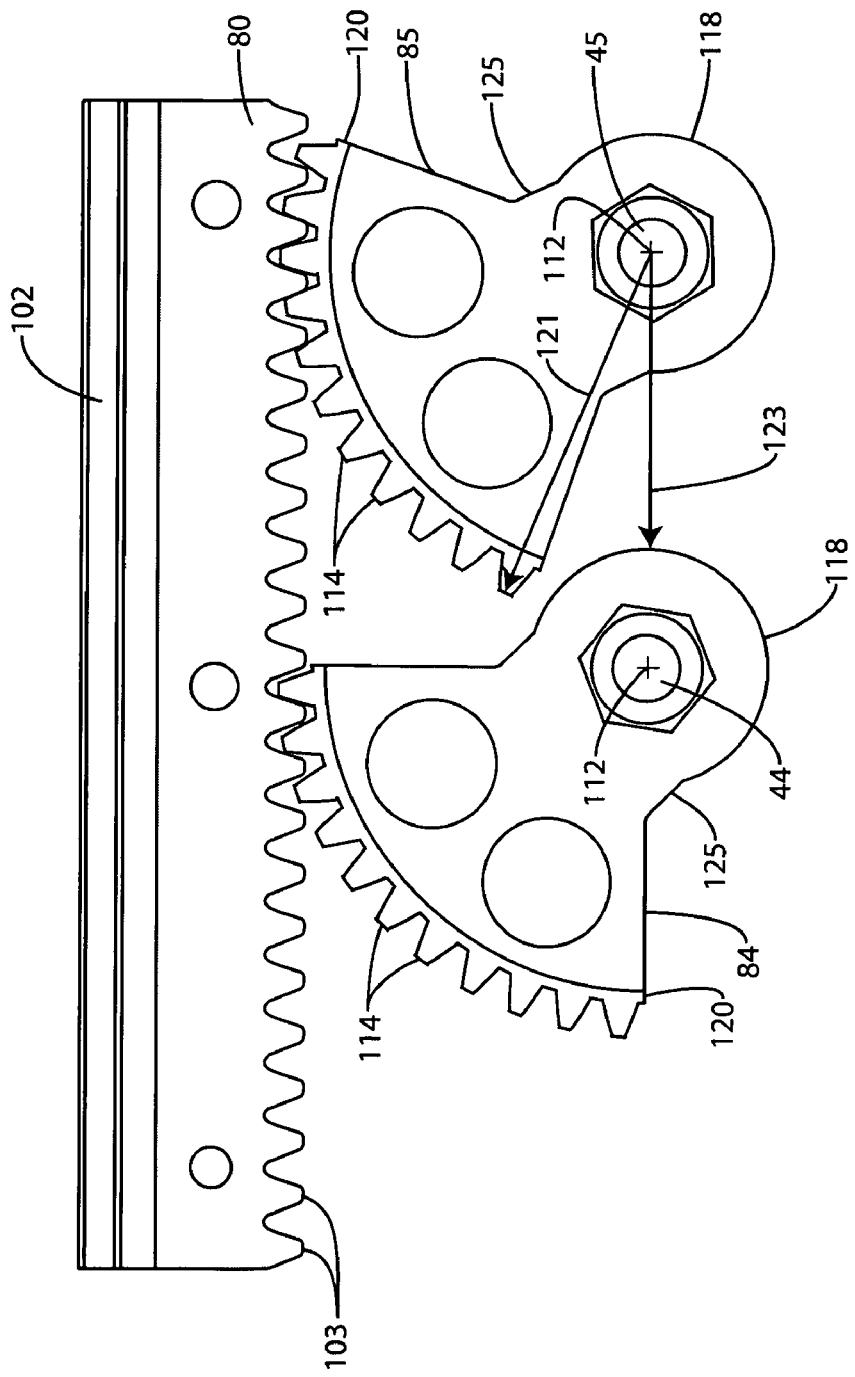
FIG. 8 is a further simplified view taken in the same direction as FIG. 7, showing the sector gears meshed with the rack of a wiper drive mechanism with its sector gears closer together than in the mechanism shown in FIG. 7.

Referring to FIGS. 7 and 8, each rocker shaft 44, 45 defines a pivot axis 112 around which the respective sector gear 84, 85 rocks, or oscillates, when it is driven by the reciprocating rack 80. In FIG. 7, the sector gears 84 and the rack 80 are shown in a central position, with the teeth 114 of the sector gears 84 and 85 meshed with the teeth 103 of the rack 80. The slide track 82 is shown fitted to the cover portion 78 of the gear case 36, and the rocker shafts 44 and 45 are mounted in the bearing support tubes 46 and 47 so as rotate about their axes 112 in response to movement of the rack 80 along the path established by the slide track 82.

As shown in FIG. 7, each of the sector gears 84 and 85 has a hub portion 118 fitted to the respective rocker shaft 44 or 45, while a toothed sector portion 120 subtends an arc of 90 degrees and has a tip radius 121 slightly smaller than the distance 122 between the axis 112 of one sector gear and the hub portion 118 of the other sector gear. As shown in FIG. 7 the pair of sector gears 84 and 85 may rotate with their respective rocker shafts 44 without interfering with each other and can be rotated through at least about 90° of arc without the teeth 103 of the rack being disengaged from the teeth 114 of either sector gear 84 or 85. The actual swept angle of rocker shaft and wiper drive arm oscillation is controlled, however, by the radius of rotation of the crank pin bolt 91 about the crank shaft 38, which controls the length of the stroke of the rack 80.

In the mechanism shown in FIG. 8, a smaller spacing 123 is provided between the axis 112 of the rocker shaft 45 and the hub 118 of the sector gear 84, and the sector gears 84, 85 are shown with the rack 80 in a position of nearly maximum excursion that rotates the rocker shafts 44, 45 to one end of the available arc. Each sector gear 84, 85 has a central portion or neck 125 between the hub 118 and the sector portion 120 which is shaped so that the sector gears 84, 85 are still able to rotate through nearly 90° without disengagement from the rack 80 or interference with each other.

Figure 9:
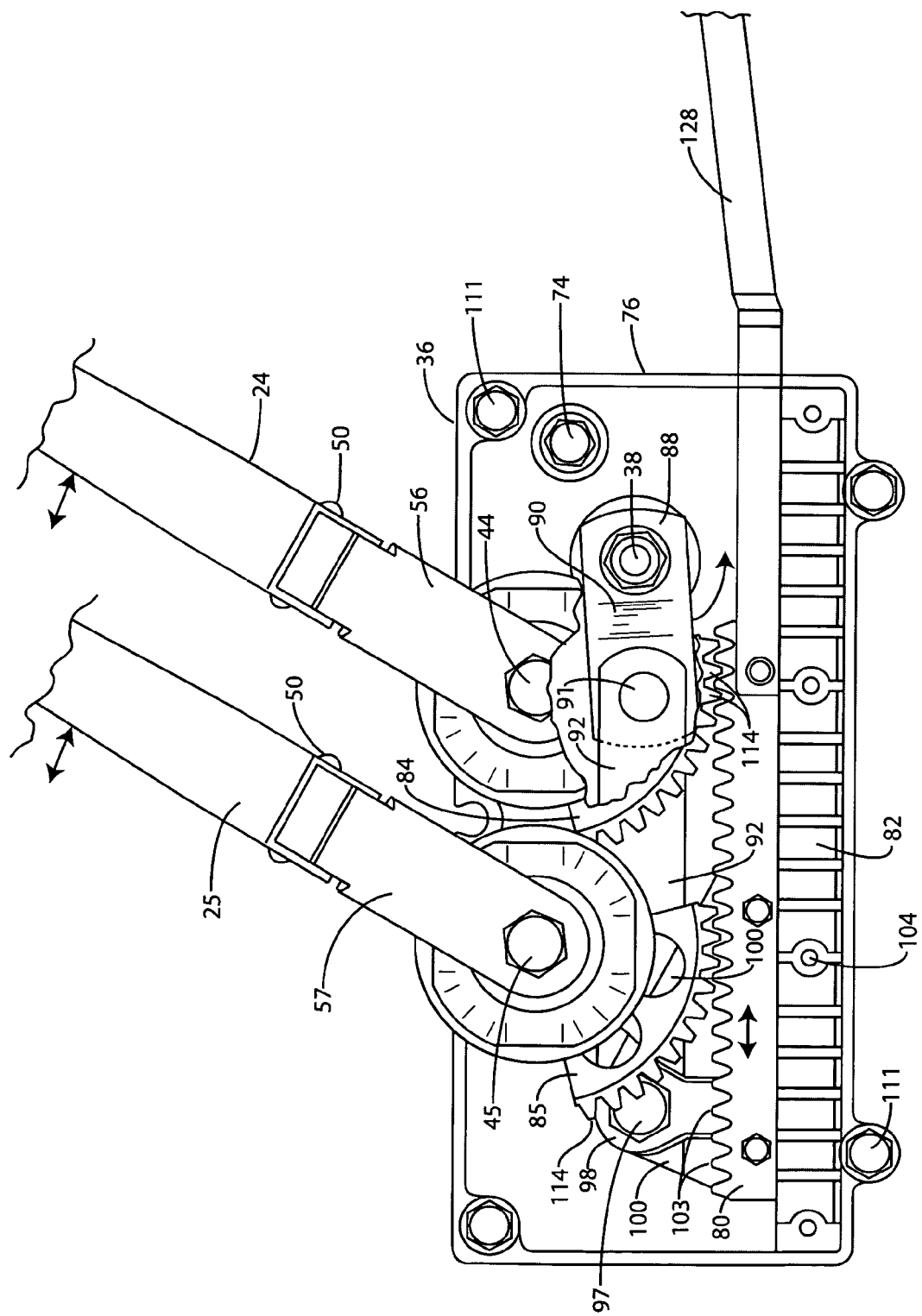
FIG. 9 is a front elevational view of a wiper drive mechanism similar to that shown in FIG. 2, with a gear case cover omitted and a part of the mechanism cut away so that other parts can be seen with clarity.

Referring to FIG. 9, the wiper drive mechanism 21 is shown assembled and fitted within the gear case 36, but with the generally planar cover portion 78 omitted for clarity. The gear case 36 is shown inverted from its orientation as shown in FIGS. 1-3, 5, and 8, as may be desirable because of the location where space is available for placement of the wiper drive system 20 in a particular vehicle. Each wiper drive arm 24, 25 is attached to the outer end of the respective rocker shaft 44 or 45. As the motor 34 (See FIG. 5) drives the reduction gear 42 and thus its output shaft, the crank shaft 38, shown in FIG. 9, rotates, carrying the connecting link 92 in rotation about the crank shaft 38 by its attachment to the crank pin 91 carried on the crank arm 88. The rail 102 (FIGS. 5, 6) of the rack 80 reciprocates along the slide track 82 as driven by the connecting link 92, whose outer end 96 is fastened to the drive pin fitting 98. In FIG. 9, the teeth 103 of the rack 80 are shown meshed with the teeth 114 of the sector gears 84 and 85, so that when the rack 80 moves the sector gears 84 and 85 are forced to rotate about their respective pivot axes 112. The sector gears 84 are spaced far enough apart so that each may each rotate about its respective pivot axis 112 without obstructing the rotation of the other. The rotation of the sector gears 84 and 85 about the rocker shaft axes 112 causes the wiper drive arms 24 and 25 to rotate reciprocatingly through an angle determined by the tip radius 121 of each sector gear and by the distance the rack 80 moves with each rotation of the crank arm 88. The entire sliding motion of the rack 80 and rotation of the sector gears 84 occurs within the gear case 36.

Figure 10:
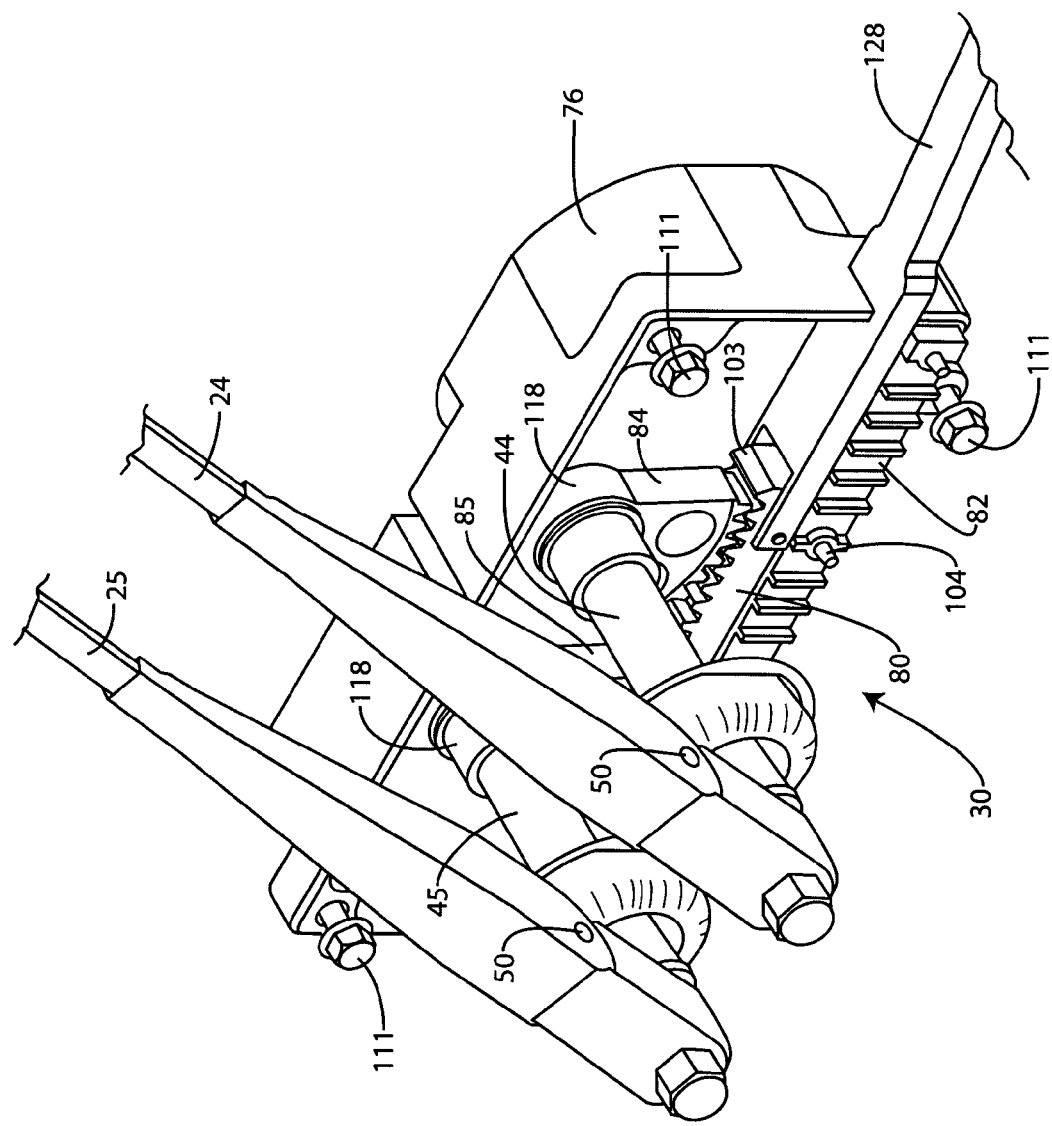
FIG. 10 is an isometric view of a wiper drive mechanism similar to shown in FIG. 9, taken from the right front, with the gear case cover omitted.

A similar wiper drive mechanism 30' shown in FIGS. 10 and 11 has no motor but can be driven by the connecting rod 128, as will be explained presently. The two wiper drive arms 24, 25 shown in FIGS. 10 and 11 rotate when the rocker shafts 44, 45 that are fixedly attached to the sector gears 84 are driven by the rack 80. Both wiper drive arms 24 and 25 move in the same direction about their rocker shaft axes 112.

Figure 11:
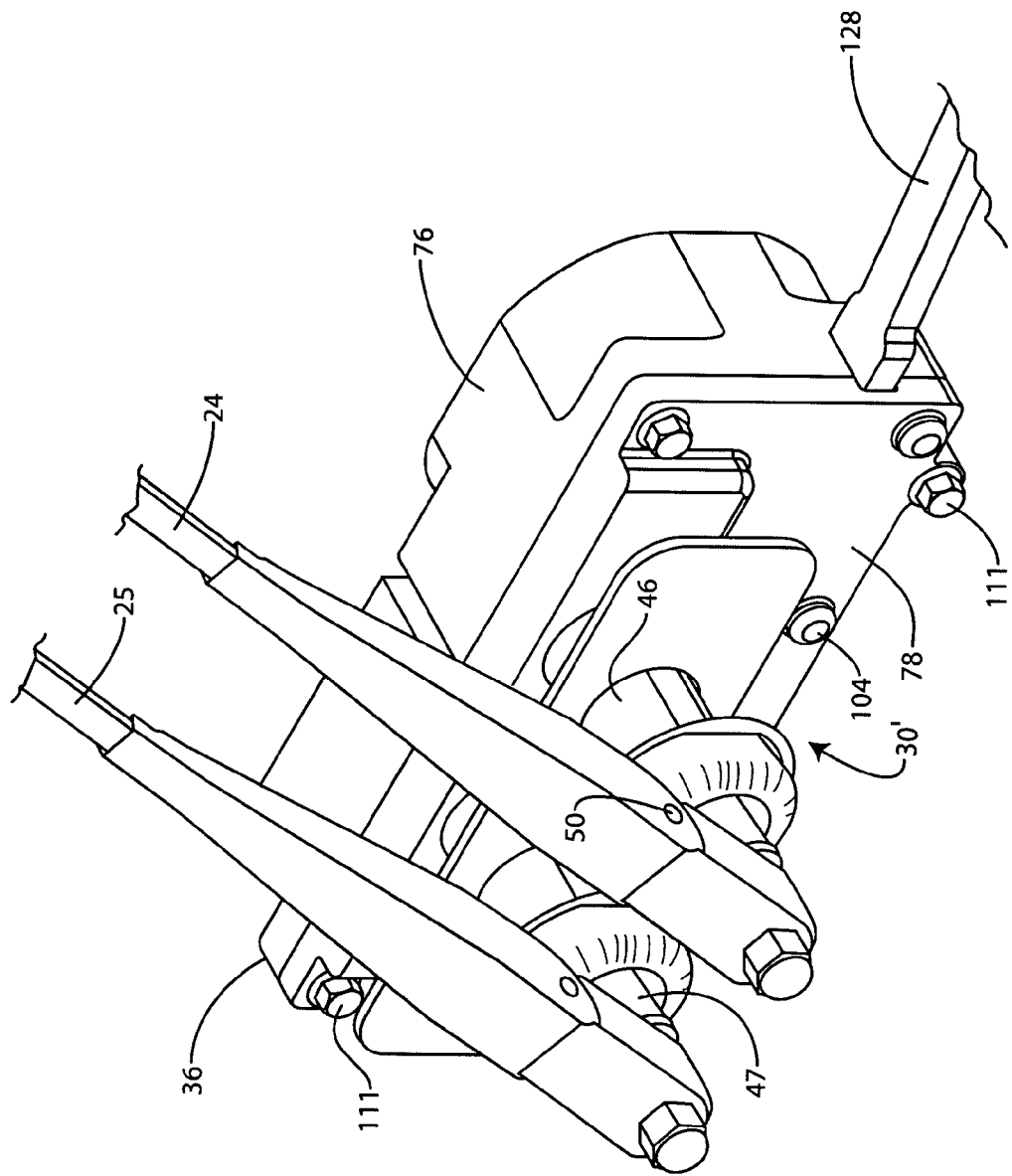
FIG. 11 is an isometric view of an assembled drive mechanism shown in FIG. 10, taken from the right front.

The gear case 36 encloses the wiper drive mechanism 30' shown in FIG. 11. The box-shaped rear portion 76 of the gear case 36 may be detachably attached to the cover portion 78 by suitable fasteners such as bolts 111. The bearing support tubes 46 and 47 extend from the generally planar cover portion 78 of the gear case 36, and the sector gears 84, 85, the rack 80, and the slide track 82, carried by the cover portion 78, are enclosed in the box-shaped case portion 76 of the gear case 36. The sector gears 84 and 85, since they are driven by the rack 80, are located conveniently in a central portion of the gear case 36, as shown in FIGS. 10 and 11. The rocker shafts 44 and 45 thus extend from the gear case 36 in a convenient laterally central location, so that the windshield wiper drive mechanisms 30 and 30' may be housed conveniently in a space designed for a wiper drive system by a vehicle manufacturer.

Figure 12:
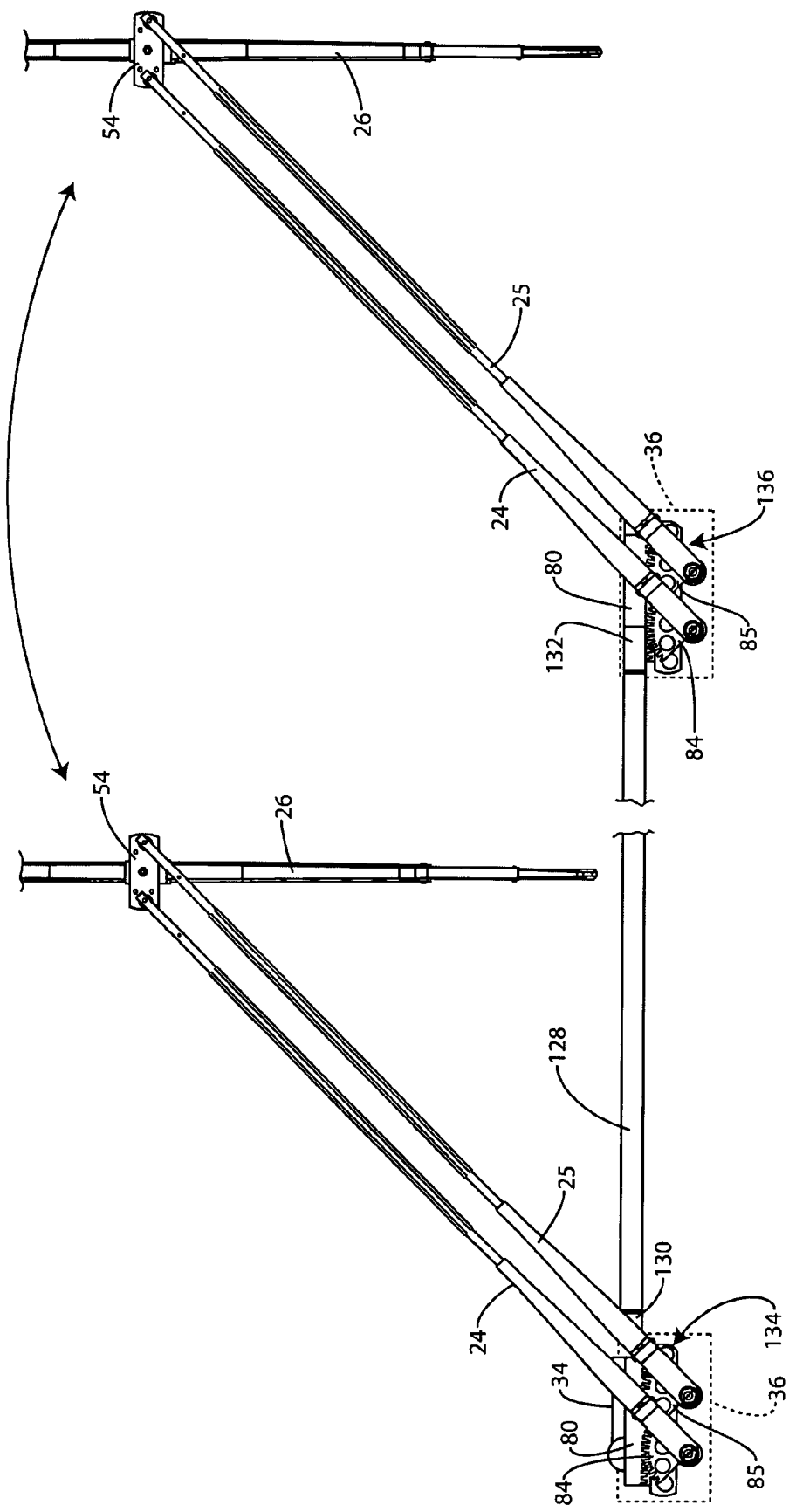
FIG. 12 is a simplified front elevational view of a wiper system including a pair of drive mechanisms similar to those shown in FIGS. 2-11 interconnected to drive a pair of wiper blades in tandem, like-direction, coordination.
Figure 13:
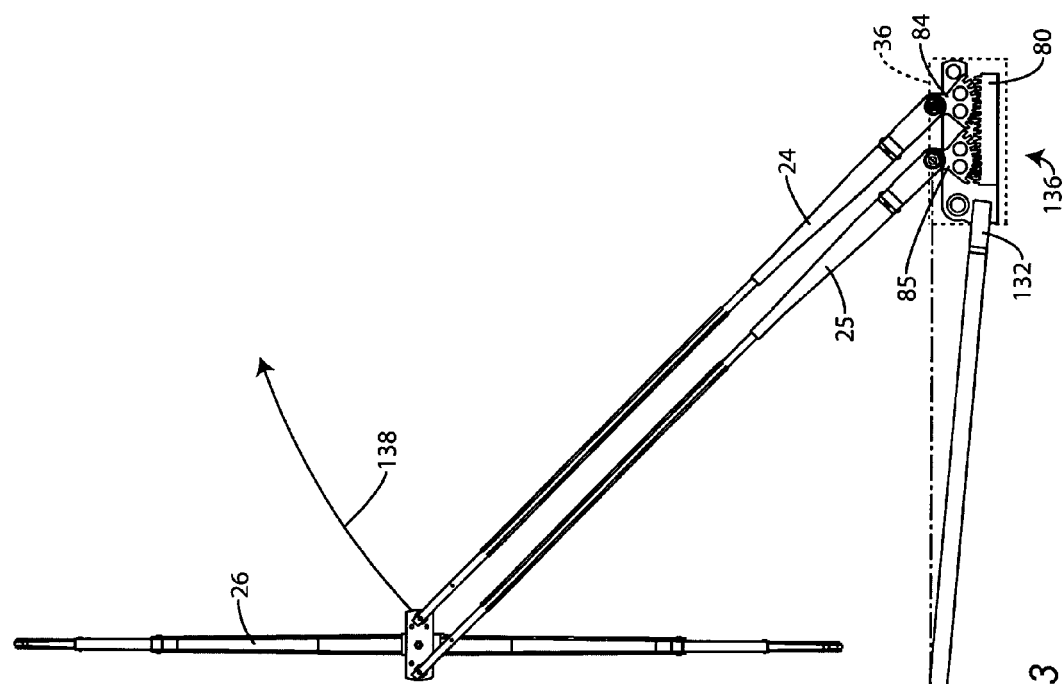
FIG. 13 is a simplified front elevational view of a wiper system including a pair of drive mechanisms interconnected to drive a pair of wiper blades in coordinated opposite-direction movement.
Figure 13:
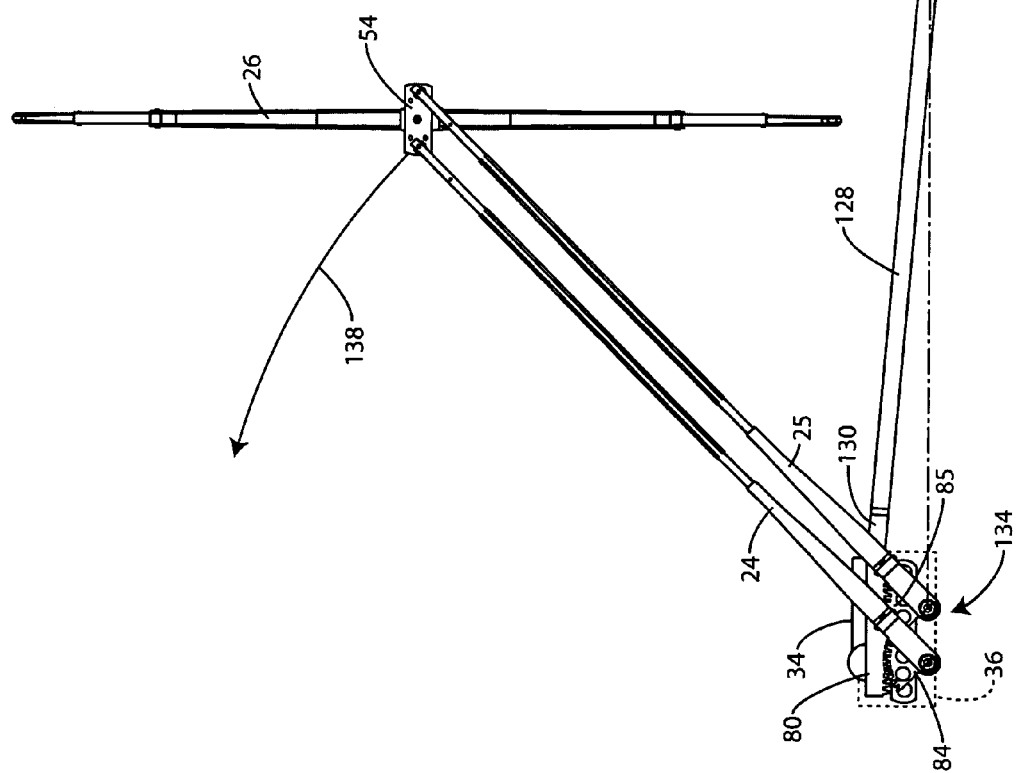

Referring to FIGS. 12 and 13, a connecting member 128 is shown extending operatively between two wiper drive mechanisms similar to the wiper drive mechanisms 30 and 30'. A motorized wiper drive mechanism 134 and a cooperative wiper drive mechanism 136 each drive a set of wiper drive arms 24, 25 to move in concert with one another. As shown in FIGS. 12 and 13, a motor 34 drives the rack 80 of the wiper drive mechanism 134. A first, or motorized end 130 of the connecting member 128 is attached to the rack 80 of the motorized wiper drive mechanism 134 and an opposite second, or driving, end 132 of the connecting member 128 is attached to the rack 80 of the cooperative wiper drive mechanism 136, so that both racks 80 move together in the same direction, which synchronizes the movement of the two sets of wiper drive arm 24 associated with the wiper drive mechanisms 134 and 136. Both pairs of wiper drive arms 24, 25 are thus actively driven by the motor 34 that is attached to the motorized wiper drive mechanism 134, and the wiper blades 26 are thus moved simultaneously.

In one embodiment illustrated in FIG. 12, the gear cases 36 of both of the wiper drive mechanisms 134 and 136 are oriented as in the drive mechanism 30 shown in FIGS. 5, 6, and 7, with the racks 80 above the sector gears 84, 85, so that the wiper drive arms 24, 25 of both of the wiper drive mechanisms 134 and 136 all sweep in the same direction at any time.

In contrast, in the wiper drive system shown in FIG. 13, the wiper blades 26 are swept across the windshield 22 in opposing directions, since the gear cases 36 are oriented oppositely, so that the toothed sectors of the sector gears 84, 85 associated with each of the two wiper drive mechanisms 134 and 136' are facing substantially opposite each other. This opposing arrangement causes the wiper blade 26 of the motorized wiper drive mechanism 134 and the wiper blade 26 of the cooperative wiper drive mechanism 136' to move oppositely, and thus alternatingly toward each other and then away from each other, as indicated by arrows 138.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A wiper drive mechanism comprising:
    (a) a set of pivot bearings respectively defining a pair of pivot axes;
    (b) a pair of sector gears, each supported for rotation about a respective one of said pair of pivot axes;
    (c) a single rack drivingly engaged with both of said sector gears and arranged to be driven reciprocatingly by a motor;
    (d) a pair of wiper drive rocker shafts, a respective one of said pair of wiper drive rocker shafts being associated with and driven by each of said sector gears and supported in a respective one of said pivot bearings;
    (e) a pair of wiper drive arms, each of said wiper drive arms being attached to a respective one of said pair of rocker shafts; and
    (f) a bridge adapted to carry a wiper blade, said bridge interconnecting said wiper drive arms and being attached to each of said wiper drive arms through a respective bridge pivot.

2. The wiper drive mechanism of claim 1 wherein each of said sector gears is carried on a respective one of said rocker shafts.

3. The wiper drive mechanism of claim 1 wherein one of said wiper drive arms includes an inner portion and an outer portion interconnected by a hinge and a tension device arranged to urge said outer portion to swing about said hinge.

4. The wiper drive mechanism of claim 1 wherein said rack is slidingly carried in and guided by a slide track.

5. The wiper drive mechanism of claim 1 including a gear case enclosing said rack and said sector gears.

6. The wiper drive mechanism of claim 5 wherein said gear case has a width and said rocker shafts are positioned centrally with respect to said width of said gear case.

7. The wiper drive mechanism of claim 5 wherein said rack is slidingly carried in said slide track, with said slide track guiding the movement of said rack and keeping said rack meshed with said sector gears.

8. The wiper drive mechanism of claim 7 wherein said slide track is fitted to said gear case.

9. The wiper drive mechanism of claim 7 wherein said rack includes a rail and wherein said rail is slidingly engaged with said slide track.

10. A wiper drive system, comprising:
    (a) a first drive mechanism, comprising:
        i. a first set of pivot bearings respectively defining a first pair of pivot axes;
        ii. a first pair of sector gears each supported for rotation about a respective one of said first pair of pivot axes, and a first rack drivingly engaged with both of said sector gears of said first pair and arranged to be driven reciprocatingly by a motor; and
        iii. a respective wiper drive rocker shaft associated with and driven by each of said sector gears of said first pair and supported in a respective one of said pivot bearings of said first set;
    (b) a second drive mechanism, comprising:
        i. a second set of pivot bearings respectively defining a second pair of pivot axes;
        ii. a second pair of sector gears each supported for rotation about a respective one of said second pair of pivot axes, and a second rack drivingly engaged with both of said sector gears of said second pair; and
        iii. a respective wiper drive rocker shaft associated with and driven by each of said sector gears of said second pair and supported in said pivot bearings of said second set; and
    (c) a connecting member interconnecting said first drive mechanism with said second drive mechanism and driving said second drive mechanism in response to movement of a part of said first drive mechanism.

11. The wiper drive system of claim 10 wherein said connecting member coordinates movement of said second drive mechanism with movement of said first drive mechanism.

12. The wiper drive system of claim 10 wherein each of said first and second racks is slidingly engaged with and guided by a respective slide track.

13. The wiper drive system of claim 12 wherein said connecting member is connected to both said first rack and said second rack, whereby reciprocating movement of said first rack causes said second rack to move reciprocatingly.

14. The wiper drive system of claim 10 including a first pair of wiper drive arms, a respective one of said first pair of wiper drive arms being associated with and driven by each one of said first pair of sector gears, and said first pair of wiper drive arms being interconnected with each other through a first bridge adapted to carry a wiper blade.

15. The wiper drive system of claim 14, further including a second pair of wiper drive arms, a respective one of said second pair of wiper drive arms being associated with and driven by each one of said second pair of sector gears, and said second pair of wiper drive arms being interconnected with each other through a second bridge adapted to carry a wiper blade.

* * * * *